PRIOR ART

INVENTOR.
BOB JACOBUS MOS
BY
Christie, Parker & Hale
ATTORNEYS.

HIGH RESOLUTION DIGITAL MAGNETIC HEAD WITH FLUX FOCUSING SHIELD

Filed May 20, 1963 2 Sheets-Sheet 2

INVENTOR.
BOB JACOBUS MOS
BY
Christie, Parker & Hale
ATTORNEYS.

United States Patent Office
3,325,795
Patented June 13, 1967

3,325,795
HIGH RESOLUTION DIGITAL MAGNETIC HEAD WITH FLUX FOCUSING SHIELD

Bob Jacobus Mos, Covina, Calif., assignor to Consolidated Electrodynamics Corporation, Pasadena, Calif., a corporation of California Filed May 20, 1963, Ser. No. 281,407
9 Claims. (Cl. 340—174.1)

This invention relates to magnetic recording devices, and more particularly to magnetic recording heads which include flux focusing shields disposed adjacent the air gap of the head.

The effectiveness of magnetic recording devices, especially for use in storage of computer information may be increased by adding to the amount of information recordable per unit length of a recording medium, such as magnetic tape. In the past problems have been encountered in magnetic recording heads by fringing of magnetic flux away from the gap defined between the pole pieces of a recording transducer in the recording head. The stray flux produces an apparent signal at locations spaced laterally of the gap in the direction of relative movement between the recording medium and the head. Accordingly, the signal produced by the flux at the gap is manifested at a preselected location of the magnetic recording medium before the preselected location and the gap are aligned. Ideally, no signal is present between the medium and the gap until the gap and the preselected location on the medium are aligned. The preselected location is the position in the medium at which the data represented by the signal is to be recorded.

If it is assumed that a pulsed signal, corresponding, for example, to a square wave pulse, is to be recorded on the medium to produce a corresponding "image" on the medium, the fringing effect of the stray flux about the gap of the head blurs the magnetic image by rounding off its desired sharp profile. The resolution of the image of the signal upon the medium is impaired, and the blurring of the signal image requires that successive signals be spaced farther apart from one another in time than if highly resolved images could be recorded in order to prevent image-overlap. By reducing the effect of the fringing of stray flux lines across the gap of the magnetic head, the resolution of signal images recorded on the medium can be increased so that images may be located closer together to improve the packing density of signals recorded on the medium by the head. Additionally, improved image resolution allows the use of simplified electronic circuitry in readout of the image. The recorded image becomes a signal to the readout pickup and its associated circuitry. As used herein, the term "image" also means signal. A signal can originate in the medium with respect to a readout device, or can originate in a read-in device to create an image.

The present invention provides a simple and inexpensive means for controlling a portion of the flux in the vicinity of the gap of a magnetic recording head.

Briefly stated the present invention provides a high resolution magnetic recording head. The head has an exterior surface past which the magnetic recording medium moves relative to the head. The head comprises a magnetic recording transducer having a magnetic core including a pair of pole tips disposed adjacent the exterior surface of the head. The ends of the pole tips are separated to define a gap therebetween. The recording head also includes a shield comprising a member fabricated from non-magnetic material having paramagnetic properties and disposed adjacent the gap on the side of the gap remote from the head exterior surface. Since the shield is fabricated of paramagnetic material, the flux lines on the side of the gap toward the shield tend to be aligned through the gap rather than around the gap. The head may include a plurality of transducers.

While the exact mechanism by which the present invention provides its increased efficiency is not completely understood, it is believed that the positioning of a paramagnetic shield impermeable to magnetic flux within the core, at a location spaced closely adjacent to the gap, directs leakage flux lines into the gap so that the flux density within the gap is increased over the flux density which would exist were no shield present. Fringing or leakage still exists on the side of the gap toward the magnetic recording medium, but it does not appear that the remaining fringing effect is in any way increased by the provision of the shield of the present invention. Accordingly, the flux density through the gap is increased with respect to the leakage flux. Since the leakage flux is reduced in value with respect to the flux through the gap, the signal at the gap is more sharply defined and higher resolution results as the signal, especially a digital data signal, is impressed magnetically upon the recording medium.

The present invention is described in more detail below and will be more completely understood by reference to the accompanying drawings wherein.

Figure 1:
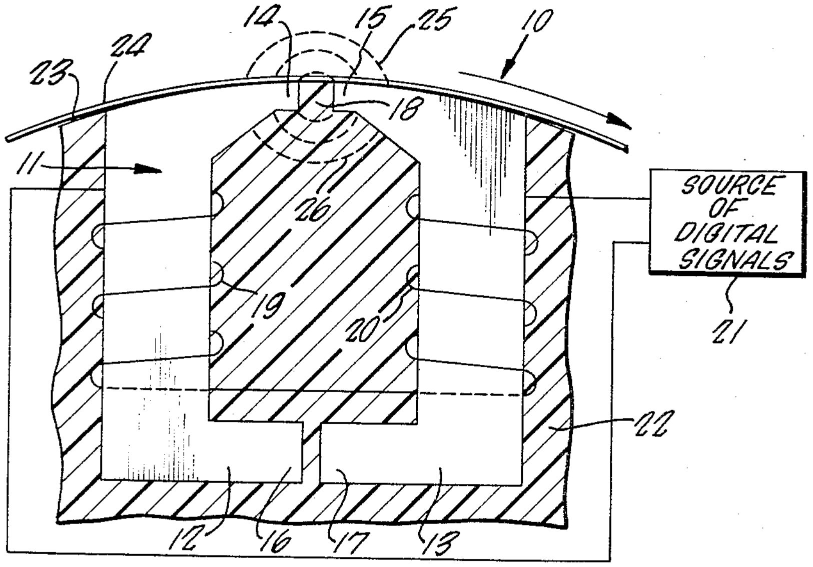
FIG. 1 is a cross-sectional elevation view of a magnetic recording head according to the prior art.

Referring initially to FIG. 1, a magnetic recording head 10 according to the prior art is illustrated. The recording head includes a magnetic recording transducer 11 comprising a pair of pole pieces 12 and 13 defining a core for the transducer. The pole pieces are of substantially C-shaped planform and are disposed open toward one another. The pole pieces have upper ends 14 and 15, respectively, and lower ends 16 and 17, respectively, which are aligned opposite from one another in spaced apart relation. The upper ends of the pole pieces define a planar gap 18 through which magnetic flux lines pass when windings 19 and 20 around the respective pole pieces are energized by an electric signal supplied from a source of digital signals 21. Coils 19 and 20 are disposed in electrical series relative to signal source 21. The pole pieces are supported in the magnetic recording head by a potting material 22. The lower ends of the pole pieces define a second gap 28 which preferably is coplanar with gap 18.

The recording head has a convex exterior surface 23. The upper ends of the pole pieces, as seen in FIG. 1, extend to surface 23 and define portions thereof. Tape 24 is an example of a magnetic recording medium which may be used with a magnetic recording head according to either the prior art or the present invention. Examples of other magnetic recording media are magnetic storage drums or magnetic recording disks.

Upon energization of coils 19 and 20 by a signal supplied from source 21, lines of magnetic flux arise in the pole pieces and across gap 18; the present invention is concerned primarily with the flux lines at gap 18. Some lines of flux flow through the air or through the potting material at either side of gap 18 and constitute leakage flux with respect to the gap. Lines 25 and 26, shown in FIG. 1, represent external and internal leakage flux lines. The ideal situation to be obtained in recording a signal on magnetic recording medium 24 is for the flux to appear instantaneously across gap 18 so that the data signal is recorded on the medium and occupies a length substantially equal to the width across gap 18. This ideal situation, however, cannot be obtained so long as the medium moves relative to the head (in most practical applications the medium moves relative to the head) and because the flux lines do not exist instantaneously across the gap. Accordingly, the recorded signal occupies a discrete length of the medium measured in the direction of relative movement between the medium and the head that is longer than the gap width.

If leakage flux lines 25 were not present, the discrete length along the medium would be sharply defined as a preselected length of the medium upon which the signal is to be recorded moves across the gap. Since the external leakage flux lines 25 are present, the selected length of the medium encounters a manifestation of the recording signal at a location somewhat spaced from the gap. This manifestation or apparent signal becomes stronger as the preselected length of the medium approaches the gap. The apparent signal causes the blurring or rounding off of the image outline as mentioned above. To prevent the blurred images from overlapping, the signals to coils 19 and 20 must be sequenced in time to provide proper spacing between the recorded signal images as the medium, such as tape 24, moves relative to the gap. The minimum spacing between signals recorded on the medium is a limiting factor in pulse (image) packing density on the medium. The minimum spacing between recorded pulses is dictated by the relative intensities of the fringe flux 25 and of the flux existing across gap 18 between pole tips 14 and 15.

Figure 2:
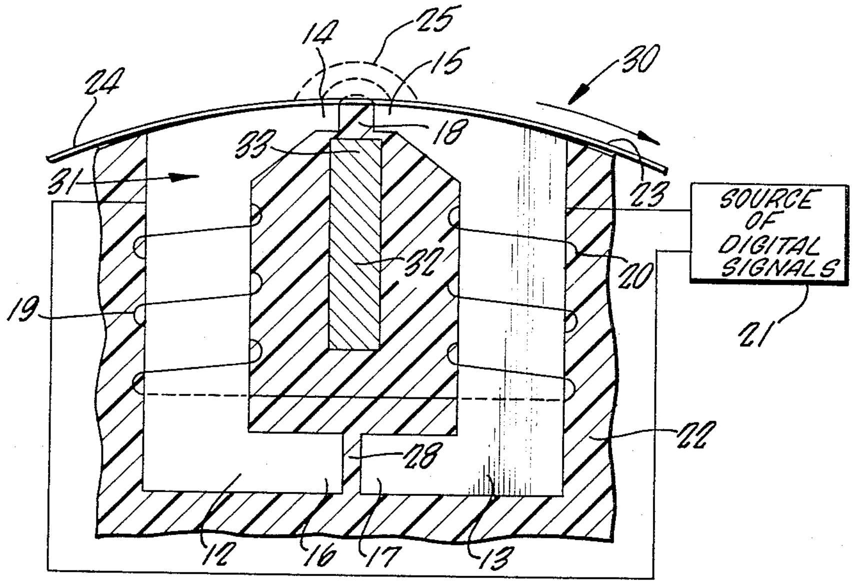
FIG. 2 is a cross-sectional elevation view similar to FIG. 1 showing a flux directing shield in a magnetic head according to the present invention.

FIG. 2 illustrates a recording head 30 according to the present invention which includes a magnetic recording transducer 31. Elements bearing the same numerals are the same throughout the figures. An element 32 of non-magnetic material is disposed within the core of transducer 31 in juxtaposition to gap 18 interiorly of the core of transducer 31. Preferably element 32 is a paramagnetic material which need not be, but preferably is, electrically conductive. As illustrated in FIG. 2, element 32 is a sheet of non-magnetic material such as copper, aluminum or mu metal having one end 33 disposed closely adjacent to pole tips 14 and 15 but not in contact with the pole tips. The non-magnetic element extends away from gap 18 toward lower pole tips 16 and 17. If the sheld were in contact with the pole tips, there would be a tendency to set up a leakage path normal to the flux across the gap. In the presently preferred embodiment of the invention illustrated in FIG. 2, the non-magnetic element is substantially planar and is disposed in the plane of gaps 18 and 28 and extends from closely adjacent gap 18 to adjacent gap 28. The presence of the body of paramagnetic material in the interior of the core of transducer 31 has the effect of increasing the reluctance through the potting material, so that the internal leakage lines present in prior art head 10, as at 26 (see FIG. 1), are directed back across the gap 18. The net result of this shunting or focusing effect is to increase the intensity of the flux lines across gap 18 even though external leakage flux 25 across the face of the head is substantially the same as in the prior art head. Accordingly, the ratio of leakage flux externally of the head to flux across gap 18 is reduced so that a signal impressed upon the core of transducer 31 through coils 19 and 20 is more sharply defined at gap 18. Accordingly, the blurring or fringing effect of external leakage lines 25 is reduced and a signal impressed upon recording medium 24 is more clearly defined. This permits a higher pulse packing density on tape 24. Improved pulse packing density may be achieved by more rapid relative movement between the recording medium and the recording head 30, or by faster pulsations through coils 19 and 20. Alternatively, in a given application, the design of the electronic circuitry associated with the readout of the signals impressed upon medium 24 is less critical since discrimination of recorded images becomes simpler.

Figure 3:
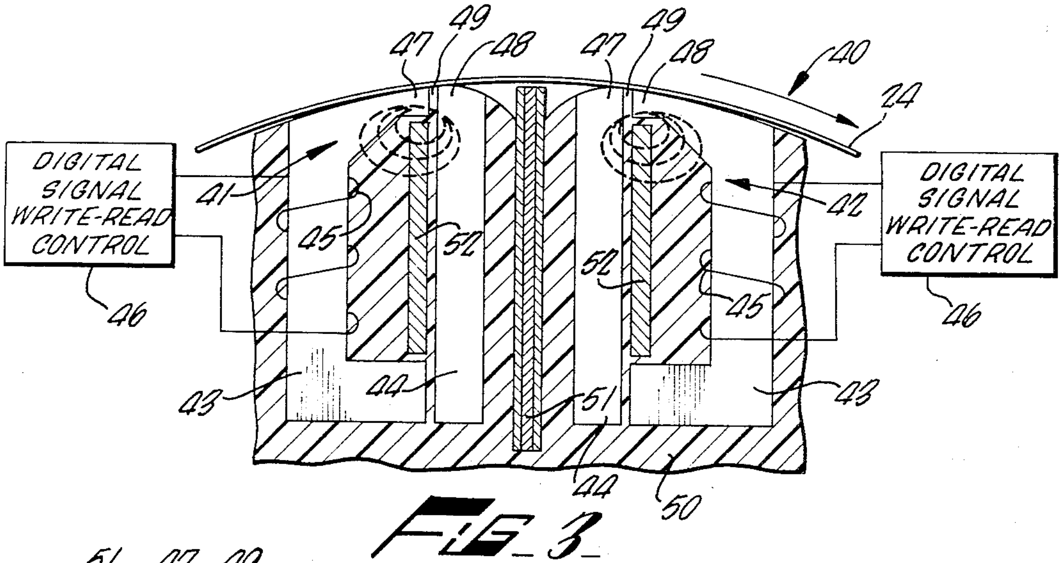
FIG. 3 is a cross-sectional elevation view of a pair of flux focused magnetic transducers in a redundant recording head according to the present invention.

FIG. 3 illustrates a redundant recording head 40 having a pair of magnetic recording transducers 41 and 42. The redundant head provides a read-in function at transducer 41 and a readout function at transducer 42 for the direction of movement of recording tape 24 as shown in FIG. 3. Each transducer 41, 42 is comprised of a substantially C-shaped pole piece 43 and a straight pole piece 44 extending between the ends of the C-shaped member. Each C-shaped member is provided with a coil 45 connected to a digital signal right read control 46. The upper ends 47, 48 of pole pieces 43 and 44, respectively (see FIG. 3), define gap 49 for recording on medium 24; the lower ends of the pole pieces define second gaps in the planes of gaps 49. Transducers 41 and 42 are separated from each other by potting material 50 and by a sandwich 51 of high mu metal and copper sheets. Sandwich 51 functions as a magnetic shield to prevent cross-feed between the two recording and reading channels defined by transducers 41 and 42. A flux directing shield 52 is disposed within each transducer parallel to the elongate extent of straight pole piece 44 and extends from just adjacent gap 49 to adjacent the lower end of C-shaped pole piece 43 in the plane of gap 49. The shield is disposed closely adjacent to, but spaced apart from, gap 49 to provide a barrier for leakage flux lines internally of the cores of transducers 41 and 42.

Figure 4:
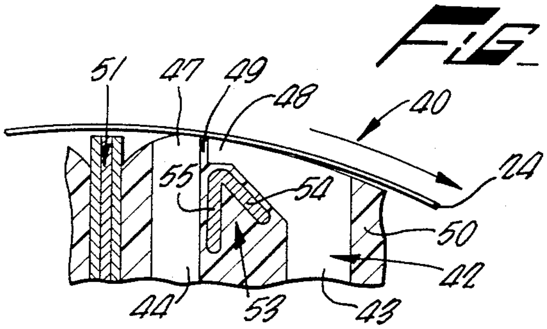
FIG. 4 is a fragmentary cross-sectional elevation view of a redundant head magnetic transducer showing a second preferred embodiment of the invention illustrated in FIG. 3.

FIG. 4 illustrates a second embodiment of flux directing shield for use in redundant head 40. Shield 53 fabricated from copper, aluminum or mu metal is, in cross-section, shaped to an acute angle between flanges 54 and 55. The flanges are joined at the heel of the angle, the heel being disposed closely adjacent to but spaced apart from gap 49. Flange 54 extends away from the gap along the adjacent portion of C-shaped pole piece 42 defining pole tip 48. Similarly, flange 55 extends parallel, to but closely spaced apart from, pole tip 47 of pole piece 44 adjacent gap 49. Shield 53 is configured to concentrate the mass of non-magnetic material in the vicinity of gap 49.

As indicated by the difference between the shields 52 and 53, the configuration of a flux directing shield may vary with the configuration of the pole pieces of its associated transducer. Other shield configurations than those illustrated in the accompanying drawings may be used. Particular configurations of magnetic transducer cores or pole pieces will dictate the desirable configurations to be given to the flux directing shields according to the principles set forth above.

Figure 5:
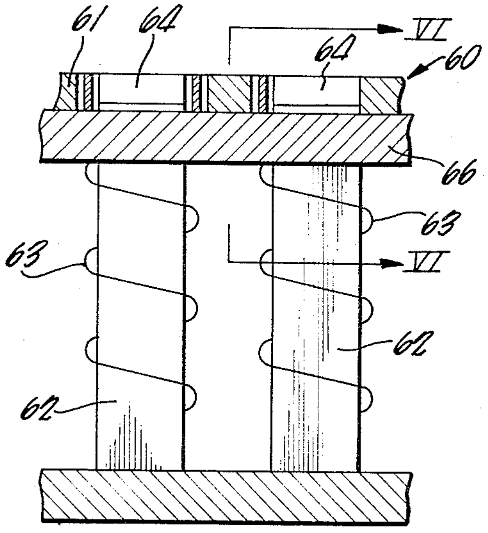
FIG. 5 is a cross-sectional elevation view of a pair of aligned magnetic transducers in a multi-channel recording head showing a shield according to the present invention.

In many recording heads, a plurality of magnetic recording transducers are disposed in a "stack" in the recording head to define a multi-channel recording head in which a plurality of signal recording channels are defined transversely of the direction of relative movement between the recording medium and the head. FIG. 5 illustrates, in cross-section, a portion of a multi-channel magnetic recording head 60 wherein a supporting block 61 encloses a plurality of magnetic cores 62 for reading or writing upon a plurality of different channels or tracks of a recording medium such as tape 24 (see FIG. 6). Each core is a portion of a separate magnetic recording transducer, the transducers being aligned to define a stack in the supporting block. Each magnetic core 62 has coil 63 wound therearound and forms a separate magnetic circuit. Each magnetic core 62 includes a pair of pole tips 64 (see FIG. 6) which are separated from one another to form a planar gap 65 which, in the case of a plurality of stacked heads, are arranged coplanarly in a direction transverse to the direction of movement of the tape. A fringe flux shield 66 is disposed common to all cores 62 of head 60. The shield is disposed parallel to the line along which the gaps are aligned and is disposed interiorly of each of the cores. The shield is closely spaced apart from the aligned gaps of the respective cores but is not in contact with the magnetic materials of any of the cores.

Figure 6:
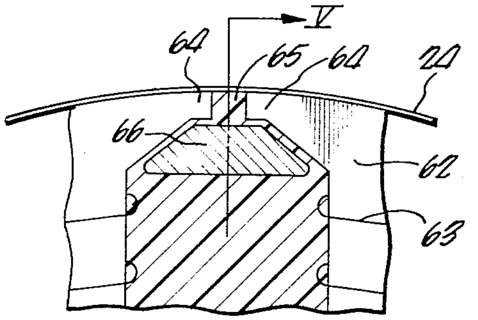
FIG. 6 is a cross-sectional elevation view taken along line VI—VI of FIG. 5.

As shown in FIG. 6, shield 66 has its mass concentrated adjacent each gap 65 and extends laterally from the plane of each gap in closely spaced relationship from the adjacent pole tip portions of each magnetic core 62. If desired, however, the shield may be a single flat plate of copper, aluminum or other non-magnetic material similar to the shields 32 and 52 illustrated in FIGS. 2 and 3. Further, each core 62 in multi-channel head 60 may be provided with its own shield of the desired cross sectional configuration. In a multi-channel head, however, it is preferred that a single shield element be used in order to facilitate fabrication of the multi-channel head.

While the invention has been described above in conjunction with specific apparatus, this has been by way of example only and is not to be considered as limiting the scope of the invention. Other configurations and arrangements of flux directing shields according to the present invention will be apparent to those skilled in the art. A flux directing shield may also be referred to as a fringe flux shield.

What is claimed is:

1. A high resolution magnetic recording head having an exterior surface past which a magnetic recording medium moves in relation to the head, the head comprising a magnetic recording transducer having a magnetic core including a pair of pole tips disposed adjacent the exterior surface of the head, the pole tips being separated to define a gap therebetween, and an element of paramagnetic material disposed adjacent but not within the gap on the side of the gap remote from the exterior surface and out of contact with the magnetic core.

2. A high resolution magnetic recording head having an exterior surface past which a magnetic recording medium moves in relation to the head, the head comprising a magnetic recording transducer having a magnetic core including a pair of pole tips disposed adjacent the exterior surface of the head, the pole tips being separated to define a planar gap therebetween, and a flux shield comprising a member fabricated of paramagnetic metal, the shield being positioned adjacent but not within the gap in the plane of the gap and out of contact with the magnetic core.

3. A high resolution magnetic recording head having an exterior surface past which a magnetic recording medium moves in relation to the head, the head comprising a magnetic recording transducer having a magnetic core shaped to form a closed loop magnetic path including a pair of pole tips disposed adjacent the exterior surface of the head, the pole tips being separated to define a planar gap therebetween, and a flux shield comprising a member fabricated of non-magnetic metal disposed within the closed loop formed by the core in the plane of the gap, the shield being disposed closely adjacent the gap out of contact with the magnetic core but not therein and extending away from the gap in closely spaced relation to the pole tips.

4. A high resolution magnetic recording head having an exterior surface past which a magnetic recording tape moves in relation to the head, the head comprising at least one magnetic recording transducer having a magnetic core, the core comprising at least one substantially C-shaped pole piece and a second pole piece, the pole pieces defining a pair of pole tips disposed adjacent the exterior surface of the head, the pole tips being separated to define a planar gap therebetween, and a flux shield comprising a member fabricated of non-magnetic material disposed within the core but out of contact with the core in juxtaposition to but not within the gap.

5. A recording head according to claim 4 wherein the second pole piece is substantially C-shaped and defines a second gap spaced from the first gap adjacent the head exterior surface, the shield being substantially planar and extending from juxtaposition with the first gap to adjacent the second gap interiorly of the core.

6. A recording head according to claim 4 wherein the second pole piece is substantially C-shaped, and the shield is disposed transversely of the plane of the gap and extends laterally from the gap in juxtaposition to the pole tips adjacent the gap.

7. A recording head according to claim 4 wherein the second pole piece is substantially straight and extends between the ends of the substantially C-shaped pole piece in spaced apart relation thereto to define the gap, the shield being substantially planar and extending in the plane of the gap parallel to the second pole piece from juxtaposition with but not within the gap to adjacent the end of the C-shaped pole piece remote from the gap.

8. A recording head according to claim 4 wherein the second pole piece is substantially straight and extends between the ends of the substantially C-shaped pole piece in spaced apart relation thereto to define the gap, the shield being disposed partially in the plane of the gap in spaced apart juxtaposition to the second pole piece adjacent the gap and partially out of the plane of the gap in spaced apart juxtaposition to the C-shaped pole piece adjacent the gap.

9. A high resolution magnetic recording head comprising (a) a plurality of magnetic recording transducers disposed parallel to one another in the head, each transducer including
  (i) a magnetic core having a pair of pole tips disposed adjacent the exterior surface of the head and defining a gap,
  (ii) the gaps of the plurality of transducers being aligned along a straight line, and
(b) a flux shield member fabricated from non-magnetic material disposed parallel to said straight line interiorly of the plurality of transducers in spaced apart juxtaposition to the cores adjacent but not within the gaps.

References Cited

UNITED STATES PATENTS

| | | | |
|---|---|---|---|
| 2,668,878 | 2/1954 | Munroe | 179—100.2 |
| 2,885,488 | 5/1959 | Andrews | 340—174.1 |
| 3,132,214 | 5/1964 | Welsh | 340—174.1 |

BERNARD KONICK, *Primary Examiner.*

A. I. NEUSTADT, *Assistant Examiner.*